(12) United States Patent
Lee

(10) Patent No.: US 7,315,298 B2
(45) Date of Patent: Jan. 1, 2008

(54) APPARATUS FOR CONTROLLING CCFL AND METHOD FOR OPERATING THE SAME

(75) Inventor: Chun-Wei Lee, Taipei (TW)

(73) Assignee: Giga-Byte Technology Co., Ltd., Taipei Hsien (TW)

(*) Notice: Subject to any disclaimer, the term of this patent is extended or adjusted under 35 U.S.C. 154(b) by 532 days.

(21) Appl. No.: 10/855,418

(22) Filed: May 28, 2004

(65) Prior Publication Data

US 2005/0264241 A1    Dec. 1, 2005

(30) Foreign Application Priority Data

Mar. 11, 2004   (TW) .............................. 93106531 A

(51) Int. Cl.
*G05F 1/00*  (2006.01)
*H05B 37/00*  (2006.01)

(52) U.S. Cl. .................................. 345/156; 315/200 A
(58) Field of Classification Search ............. 315/169.3, 315/169.4, 169.1, 169.2, 200 A; 345/176, 345/156

See application file for complete search history.

(56) References Cited

U.S. PATENT DOCUMENTS

| | | | |
|---|---|---|---|
| 6,201,554 B1* | 3/2001 | Lands | 345/169 |
| 6,832,729 B1* | 12/2004 | Perry et al. | 235/472.01 |
| 6,847,351 B2* | 1/2005 | Noguera | 345/158 |
| 6,933,923 B2* | 8/2005 | Feinstein | 345/158 |
| 7,095,392 B2* | 8/2006 | Lin | 345/87 |
| 2005/0228281 A1* | 10/2005 | Nefos | 600/446 |

* cited by examiner

*Primary Examiner*—Shih-Chao Chen
*Assistant Examiner*—Minh Dieu A
(74) *Attorney, Agent, or Firm*—Troxell Law Office, PLLC

(57) ABSTRACT

A flashing apparatus controlled by an audio signal on a motherboard and a method for the same is proposed. The flashing apparatus has at least one cold cathode fluorescent lamp (CCFL), a motherboard and a controller. The CCFL is connected to a high voltage cable and receives a high voltage power to emit light of at least one color. The motherboard executes a sound effect software to send a lighting pulse signal to the controller. The controller is electrically connected to the high voltage power for the CCFL. The controller receives the lighting pulse signal and converts it into the high voltage power to make the CCFL flash.

18 Claims, 5 Drawing Sheets

APPARATUS FOR CONTROLLING CCFL AND METHOD FOR OPERATING THE SAME

FIELD OF THE INVENTION

The present invention relates to an apparatus for controlling the flashing of cold cathode fluorescent lamp (CCFL) by audio signal from a motherboard and a method for the same, and especially to an apparatus for controlling the flashing of CCFL attached on computer chassis or peripheral by audio signal from a motherboard and a method for the same.

BACKGROUND OF THE INVENTION

As the advance of digital technology, the computer is omnipresent for people Therefore, the aesthetic aspect of a computer becomes more and more important in addition to its functionality.

The aesthetic aspect of an article can be greatly enhanced by lighting effect, as with stage lighting.

A prior art decoration for computer uses cold cathode fluorescent lamp (CCFL) on the chassis of a computer and is driven by a controller with reference to a sound card. The CCFL is a lighting device using high-pressure gas for discharging light and has the advantage of low power consumption, bright color, flexible shape and low radiation.

The flashing pattern of the current cold cathode fluorescent lamp for decorating a computer is determined by audio volume, which comes from line-out end of a sound card, line-in end of loudspeaker and sound input of an external microphone. However, the flashing effect of current cold cathode fluorescent lamp may be degraded by noise from computer or external noise source. Moreover, the control circuit for the decorating CCFL is complicated due to compatibility requirements with the impedance of the sound card and the loudspeaker.

SUMMARY OF THE INVENTION

It is the object of the present invention to provide a method for controlling the flashing of cold cathode fluorescent lamp (CCFL) by an audio signal from a motherboard. The method can avoid the interference from external noise and enables a user to light the CCFL according to a predetermined audio frequency and audio volume.

To achieve the above object, the present invention provides a method for controlling the flashing of a CCFL. Power is supplied from the motherboard and the power is boosted to a high voltage power for lighting the CCFL. A digital audio signal is fetched from the motherboard and converted into a lighting pulse signal according to at least one of an audio frequency and an audio volume. The high voltage power is turned on and off according to the lighting pulse signal, thus causing the CCFL to flash.

To achieve the above object, the present invention provides a flashing apparatus having at least one CCFL, a motherboard and a controller. The CCFL is connected to a high voltage cable and receives a high voltage power to emit light of at least one color. The motherboard executes a sound effect software to send a lighting pulse signal to the controller. The controller is electrically connected to the high voltage power for the CCFL. The controller receives the lighting pulse signal and converts it into the high voltage power for driving the CCFL in a flashing fashion.

To achieve the above object, the present invention provides a flashing apparatus having at least one CCFL, a motherboard and a controller. The CCFL is connected to a high voltage cable and receives a high voltage power to emit light of at least one color. The motherboard executes a sound effect software to send a lighting pulse signal to a computer connection port. The controller is electrically connected to the connection port and the high voltage power for the CCFL. The controller receives the lighting pulse signal and converts it into the high voltage power to make the CCFL flash.

BRIEF DESCRIPTION OF DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE INVENTION

In the preset invention, a CCFL is arranged on a computer chassis or a computer peripheral. In a first preferred embodiment of the preset invention, a CCFL controller for the CCFL is directly arranged on a motherboard such that the power for the CCFL comes directly from the motherboard. In a second preferred embodiment of the preset invention, a connection port of computer, such as parallel port, serial port, USB port, is connected to the CCFL controller for the CCFL such that the power for the CCFL comes directly from the connection port. The flexibility and high brightness of the CCFL provides the computer with a fancy aesthetic effect.

Figure 1:
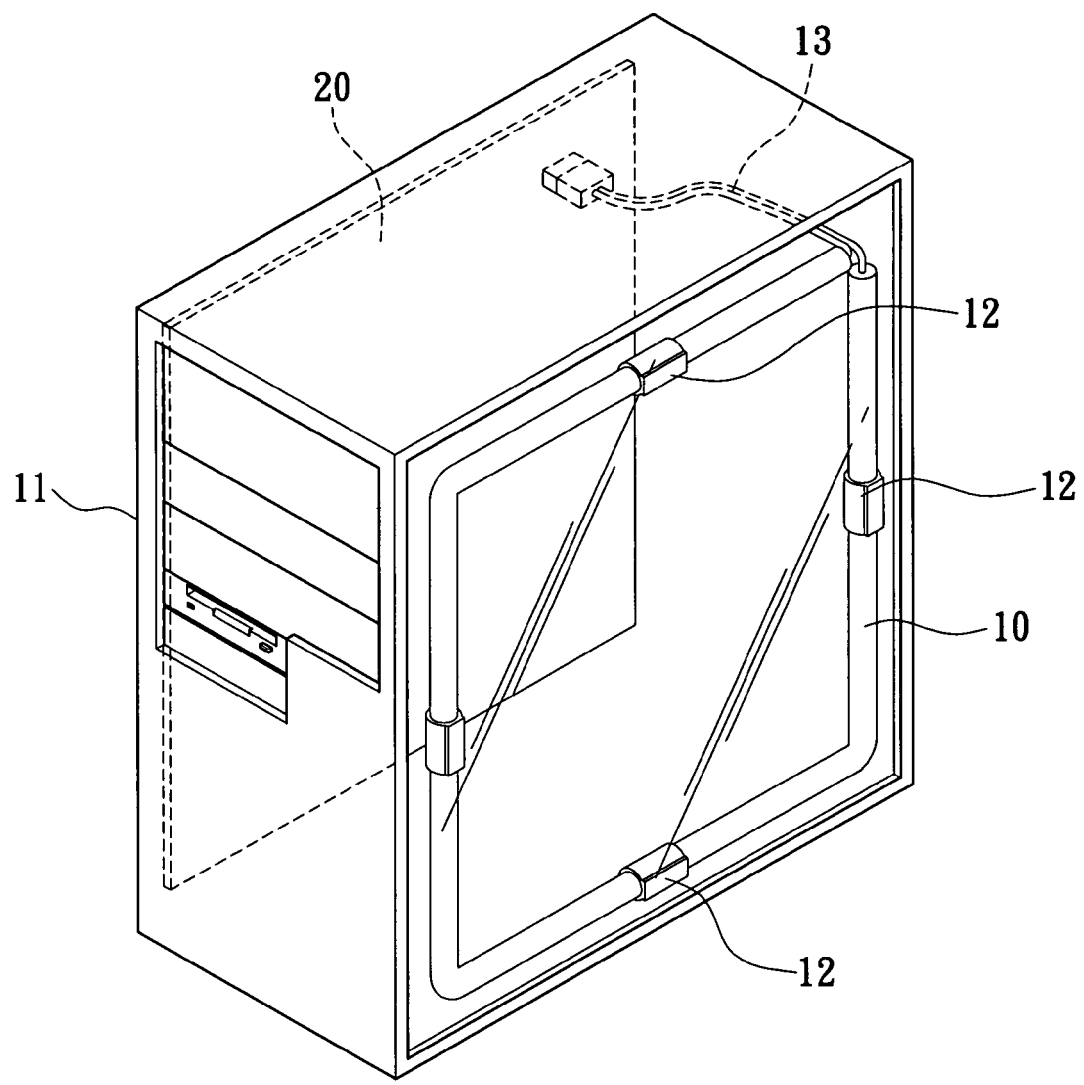
FIG. 1 shows a perspective view of the first preferred embodiment of the preset invention.
Figure 2:
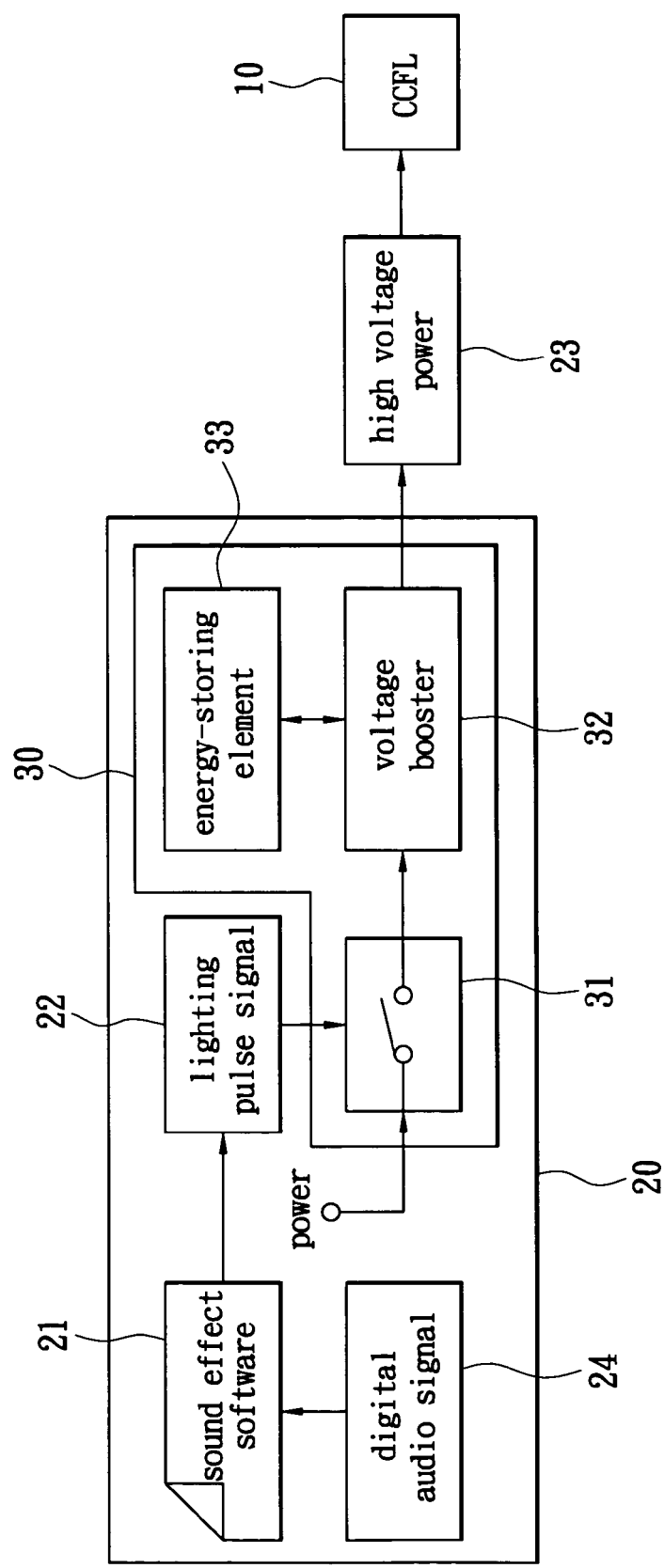
FIG. 2 shows a block diagram of the first preferred embodiment of the preset invention.

The CCFL emits light by gas discharge and provides light color such as, for example, blue, red, purple or green. FIG. 1 shows a perspective view of the first preferred embodiment of the preset invention, in which at least one CCFL 10 is arranged on the computer chassis 11. FIG. 2 shows a block diagram of the first preferred embodiment of the preset invention.

In the present invention, the computer chassis 11 is made of transparent material and a plurality of clips 12 are arranged on inner edges of the chassis 11 to fix the CCFL 10. The CCFL 10 can be bent into a predetermined shape such as rectangle or circle. A high voltage cable 13 is connected to the CCFL 10 and detachably connected to the motherboard 20 of the computer.

The motherboard 20 is arranged within the chassis 11 and sends a lighting pulse signal 22 to a controller 30 by executing sound effect software 21. The controller 30 is arranged on the motherboard 20 and electrically connected to the high voltage cable 13. The controller 30 receives the lighting pulse signal 22 and converts the lighting pulse signal 22 into a high voltage power 23. Afterward, the motherboard 20 supplies the high voltage power 23 to the CCFL 10 such that the CCFL 10 can emit light of at least one color.

The sound effect software 21 is a software executable on a computer and generates a digital audio signal 24 by fetching music file, sound effect file or multimedia file played on the computer. The sound effect software 21 is executed to display a plurality of audio frequency control options and a plurality of volume control options on monitor. Therefore, a user can select the lighting pulse signal 22 with reference to the audio frequency in 100 Hz-20 KHz, the audio volume or both. The CCFL 10 can emit light of a predetermined color when the digital audio signal 24 contains a preset audio frequency or audio volume.

The controller 30 comprises at least one switch 31, a voltage booster 32 and at least one energy-storing element 33. The switch 31 is a transistor, a MOSFET transistor or a relay to turn on/off a power according to the control of the lighting pulse signal 22. The voltage booster 32 is a boosting transformer and electrically connected to the switch 31. The voltage booster 32 boosts the power into the high voltage power 23 for the CCFL 10. The energy-storing element 33 is a capacitor connected to the high voltage power 23 for storing the high voltage power 23.

Figure 3:
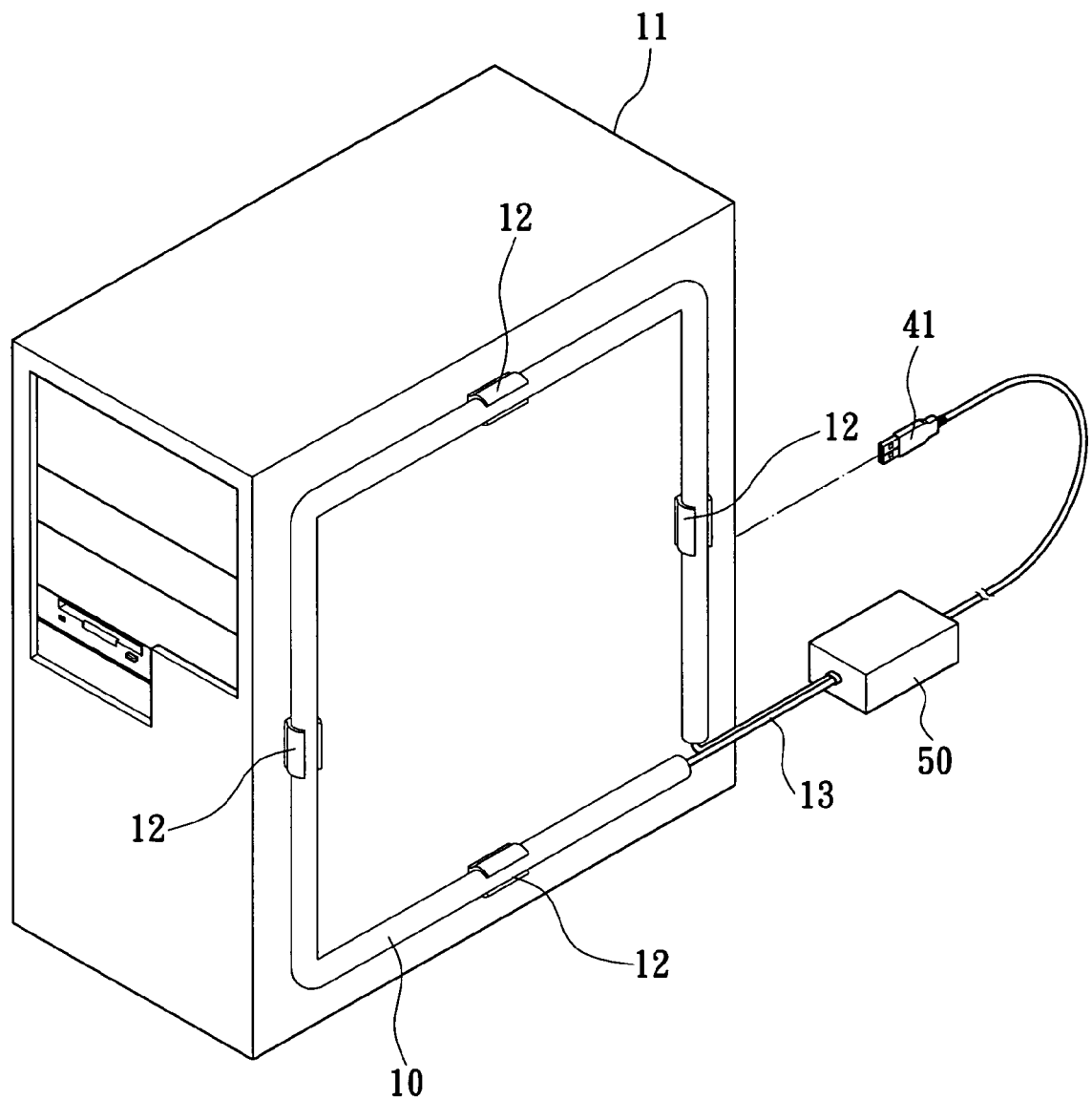
FIG. 3 shows a perspective view of the second preferred embodiment of the preset invention.
Figure 4:
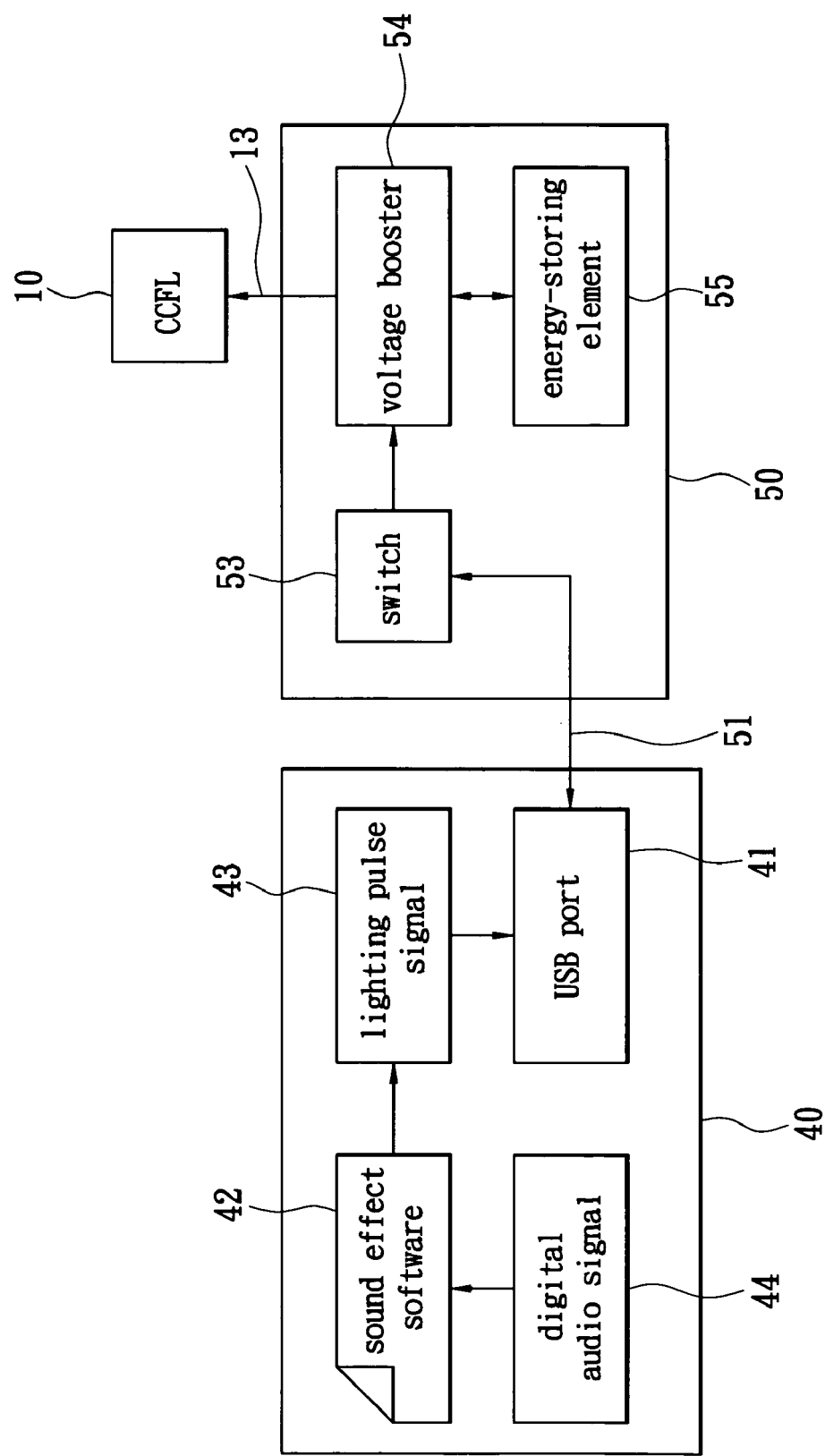
FIG. 4 shows a block diagram of the second preferred embodiment of the preset invention.

FIG. 3 shows a perspective view of the second preferred embodiment of the preset invention. FIG. 4 shows a block diagram of the second preferred embodiment of the preset invention. In this preferred embodiment of the preset invention, the CCFL 10 is arranged outside the computer. A plurality of clips 12 is arranged at outer corners of the chassis 11 for fixing the CCFL 10. Similarly, the CCFL 10 is connected to a high voltage cable 13.

A motherboard 40 is arranged in the chassis 11 and has a USB port 41. The motherboard 40 sends a lighting pulse signal 43 to the USB port 41 by executing sound effect software 42. The sound effect software 42 converts a digital audio signal 44 into the lighting pulse signal 43 according to the audio frequency and audio volume in the digital audio signal 44.

In this preferred embodiment, a controller 50 is provided with a USB cable 51 connected to the USB port 41 of the motherboard 40 and has a connection end 52 for connecting to the high voltage cable 13. The controller 50 is similar to that in the first preferred embodiment except that it is externally connected. The controller 50 comprises at least one switch 53, a voltage booster 54 and at least one energy-storing element 55 and is used to receive the lighting pulse signal 43 and convert it into high voltage power for the CCFL 10.

Figure 5:
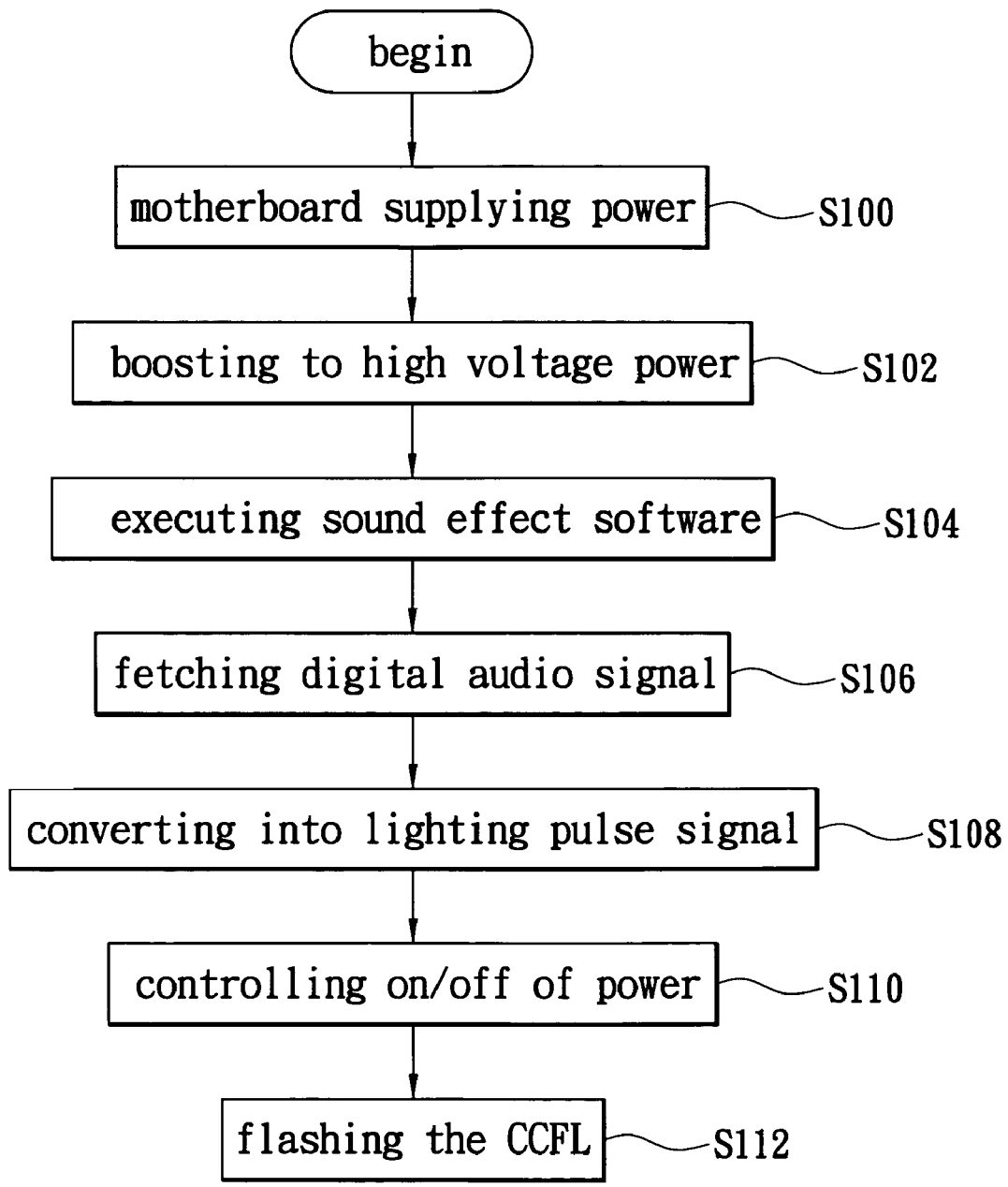
FIG. 5 shows a flowchart according to the present invention.

FIG. 5 shows a flowchart according to the present invention. The method according to the present invention controls the flashing of a CCFL by fetching an audio signal on a motherboard. In step S100, the motherboard supplies power. In step S102, the power is boosted to a high voltage power for lighting at least one CCFL. The power can be 12V on the motherboard or 5V from the USB port and then boosted to the high voltage power for lighting the CCFL.

In step S104, a sound effect software is executed to fetch a digital audio signal on motherboard in step S106. In step S108, a lighting pulse signal is generated according to the audio frequency and audio volume in the digital audio signal. In step S110, the on/off of the CCFL is controlled by the lighting pulse signal; therefore, and the CCFL flashes in step S112.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method controlling a flashing of a cold cathode fluorescent lamp (CCFL) by fetching an audio signal on a motherboard, comprising steps of:
   supplying a power from the motherboard and boosting the power to a high voltage power for lighting the CCFL;
   fetching a digital audio signal from the motherboard and converting the digital audio signal into a lighting pulse signal, pulsing of the lighting pulsing signal being based on an audio frequency or an audio volume; and
   controlling on and off of the high voltage power according to the lighting pulse signal, thus driving the CCFL in a flashing manner.

2. The method controlling a flashing of a CCFL as in claim 1, wherein in the step of supplying a power from the motherboard, the motherboard supplies the power from a connection port thereof.

3. The method controlling a flashing of a CCFL as in claim 2, wherein the connection port is a USB port, a parallel port or a serial port.

4. The method controlling a flashing of a CCFL as in claim 1, wherein the step of fetching a digital audio signal is executed by a sound effect software.

5. The method controlling a flashing of a CCFL as in claim 4, wherein the sound effect software has an audio volume option to control the lighting pulse signal according to the audio volume.

6. The method controlling a flashing of a CCFL as in claim 4, wherein the sound effect software has an audio frequency option to control the lighting pulse signal according to the audio frequency.

7. The method controlling a flashing of a CCFL as in claim 4, wherein the sound effect software has at least one of an audio frequency option and an audio volume option to control the lighting pulse signal according to the audio frequency or the audio volume.

8. A flashing apparatus controlled by an audio signal on a motherboard, comprising:
   at least one cold cathode fluorescent lamp (CCFL) connected to a high voltage cable and received a high voltage power to emit light of at least one color;
   a motherboard arranged in a computer chassis and generating a lighting pulse signal, pulsing of the lighting pulsing signal being controlled by a sound effect software; and
   a controller arranged on the motherboard and electrically connected to the high voltage power for the CCFL, the controller receiving the lighting pulse signal and converting the lighting pulse signal into the high voltage power to make the CCFL flash.

9. The flashing apparatus as in claim 8, wherein the sound effect software has at least one of an audio frequency option and an audio volume option to control the lighting pulse signal according to the audio frequency or the audio volume.

10. The flashing apparatus as in claim 8, wherein the sound effect software has an audio volume option to control the lighting pulse signal according to the audio volume.

11. The flashing apparatus as in claim 8, wherein the sound effect software has an audio frequency option to control the lighting pulse signal according to the audio frequency.

12. The flashing apparatus as in claim 8, wherein the controller comprises
- at least one switch to turn on/off the power according to a control of the lighting pulse signal;
- a voltage booster connected to the switch and used to convert the power into the high voltage power and supply the high voltage power to CCFL; and
- at least one energy-storing element connected to the high voltage power for saving energy for the high voltage power.

13. A flashing apparatus controlled by an audio signal on a motherboard, comprising:
- at least one cold cathode fluorescent lamp (CCFL) connected to a high voltage cable and receiving a high voltage power to emit light of at least one color;
- a motherboard arranged in a computer chassis and generating a lighting pulse signal to a computer connection port, pulsing of the lighting pulsing signal being controlled by a sound effect software; and
- a controller electrically connected to the computer connection port and the high voltage power for the CCFL, the controller receiving the lighting pulse signal and converting the lighting pulse signal into the high voltage power to make the CCFL flash.

14. The flashing apparatus as in claim 13, wherein the connection port is a USB port, a parallel port or a serial port.

15. The flashing apparatus as in claim 13, wherein the sound effect software has an audio volume option to control the lighting pulse signal according to the audio volume.

16. The flashing apparatus as in claim 13, wherein the sound effect software has an audio frequency option to control the lighting pulse signal according to the audio frequency.

17. The flashing apparatus as in claim 13, wherein the sound effect software has at least one of an audio frequency option and an audio volume option to control the lighting pulse signal according to the audio frequency or the audio volume.

18. The flashing apparatus as in claim 13, wherein the controller comprises
- at least one switch connected to the connection port and receiving a power from the connection port, the switch being used to turn on/off the power according to a control of the lighting pulse signal;
- a voltage booster connected to the switch and used to convert the power into the high voltage power and supply the high voltage power to the CCFL; and
- at least one energy-storing element connected to the high voltage power for saving energy for the high voltage power.

* * * * *